United States Patent [19]

Kronbetter

[11] Patent Number: 5,363,596
[45] Date of Patent: Nov. 15, 1994

[54] SEAL ASSEMBLY FOR A SLIDING WINDOW

[75] Inventor: Clarence W. Kronbetter, St. Joseph, Mich.

[73] Assignee: Chardon Rubber Company, Chardon, Ohio

[21] Appl. No.: 207,573

[22] Filed: Mar. 7, 1994

[51] Int. Cl.$^5$ .............................................. E06B 7/16
[52] U.S. Cl. ................................... 49/495.1; 49/404; 49/475.1; 49/489.1
[58] Field of Search .................... 49/495.1, 489.1, 404, 49/475.1

[56] References Cited

U.S. PATENT DOCUMENTS

| | | | |
|---|---|---|---|
| 4,785,583 | 11/1988 | Kawagoe et al. | 49/404 |
| 5,085,005 | 2/1992 | Yasukawa et al. | 49/495.1 X |
| 5,170,586 | 12/1992 | Ose et al. | 49/495.1 X |

*Primary Examiner*—Philip C. Kannan
*Attorney, Agent, or Firm*—Renner, Kenner, Greive, Bobak, Taylor & Weber

[57] ABSTRACT

An improved seal for a sliding window pane in a vehicular backlite. The improved seal has a mounting base secured within a receiving recess presented from a fixed member in a window frame. A hinge is supported from the mounting block, and the mounting base, in turn, supports a pair of sealing lips that are preferably formed integrally with the mounting base. The sealing lips are adapted to engage the exterior surface of a sliding window pane. Opening the sliding window pane permits the hinge to pivot the sealing lips to an open position wherein the first lip is disposed out of engagement with the exterior surface of the window pane, and the second sealing lip is moved into the displacement axis of the sliding window pane. Upon closure, the sliding window pane engages the second sealing lip to pivot the hinge and drive the first sealing lip into engagement with the exterior surface of the sliding window pane. The configuration, and disposition, of the first sealing lip prevents entrance of even pressurized water therepast by increasing the sealing pressure of at least the first lip against the exterior surface of the sliding window pane.

10 Claims, 7 Drawing Sheets

SEAL ASSEMBLY FOR A SLIDING WINDOW

TECHNICAL FIELD

The present invention relates generally to window seals. More particularly, the present invention relates to seals for sliding vehicular windows. Specifically, the present invention relates to a unique seal for sliding windows, the seal serving effectively to enhance the prevention of water incursion into the passenger compartment of a vehicle.

BACKGROUND OF THE INVENTION

Vehicles, such as pickup trucks, have a rear window, or backlite, that is mounted in an opening in the rear body panel of the cab—normally behind the operator's seat. These backlites are provided to the truck manufacturer, or the after-market, as window frame assemblies. The current window frame assemblies that are commercially available generally have either a welded metal frame, usually aluminum, or a rigid plastic frame, both versions of which are sized to fit in the body panel opening.

Figure 1:
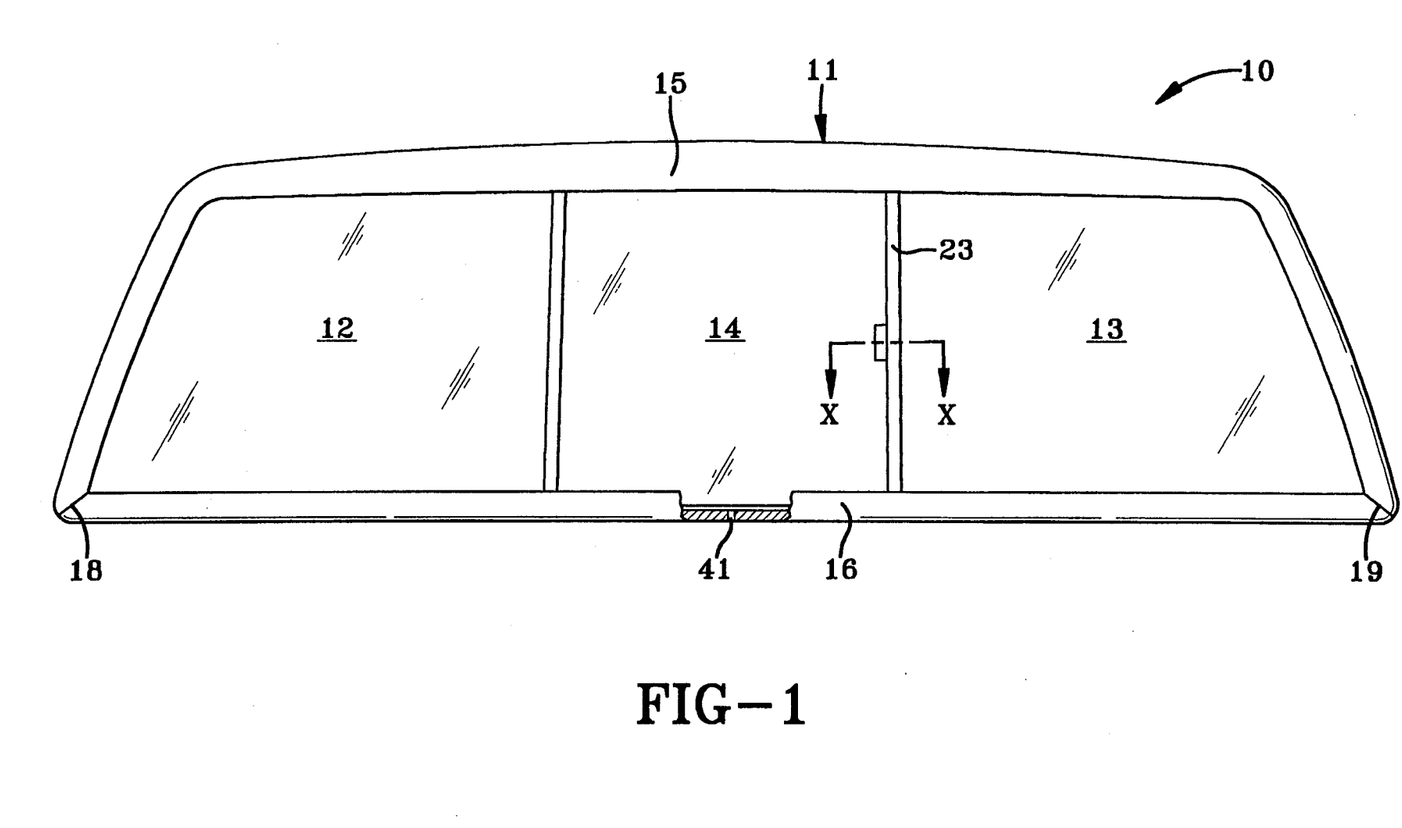
FIG. 1 a rear elevation of a typical backlite for a truck or other similar vehicle.

Irrespective of the material from which it is made, the frame generally has a bow-shaped outline when viewed in elevation, as represented in FIG. 1, with the upper corners being curved to fit the opening in the body panel. The upper portion of the frame thus provides the bow shape, and the lower rail portion, which is generally linear, is secured to the ends of the upper portion. Typically, the upper and lower portions have beveled ends which may be secured together to form the frame. A continuous channel is generally provided along the interior of the frame to support the upper and lower edges of the sliding window pane, or panes. A second, parallel channel supports a pair of fixed window panes.

Such window assemblies normally take the form of: one fixed window and one sliding window; two fixed and two sliding windows; or, two fixed windows and one sliding window. The most popular of these combinations appears to be two fixed windows and one sliding window. The fixed windows are secured in the frame, and the frame is bonded, or otherwise secured, within the opening in the rear wall of the vehicle cab. The sliding window is preferably disposed medially of the two fixed windows, which facilitates operation of the sliding window by either the driver or a passenger.

The side edges of the fixed window panes, adjacent the sliding window pane, are supported by vertical struts which are secured between the upper and lower portions of the frame. The remaining sides of the fixed window panes are each secured to, and are sealed in, the frame. A separate seal is provided along the upper and lower edges of the sliding window pane to prevent leakage of moisture to the interior of the vehicle when they are closed. The general structure incorporated in the frame assemblies for such windows is described in U.S. Pat. No. 5,228,740 issued on Jul. 20, 1993, to Robert B. Saltzman for "Vehicular Window Frame Assembly for Sliding Window Panes" and is owned by Chardon Rubber Company, the assignee of the present invention.

The present invention focuses on the specific seal configuration employed along the closure edge of the sliding pane—i.e.: the leading edge of the sliding pane which delineates one side of the opening provided when the window is open as well as that edge which moves into opposing engagement with a locking flange on the appropriate vertical strut when the window is closed.

With reference to FIG. 1, a representative window frame assembly 10 includes a frame 11, a pair of laterally spaced, first and second, fixed window panes 12 and 13 and a sliding window pane 14 disposed between the fixed panes 12 and 13. The frame 11 is preferably fabricated from an upper bow portion 15 and a lower, or bottom, rail portion 16 which are secured at the beveled corners 18 and 19 formed at the intersection of the bow portion 15 with the opposite ends of the normally linear rail portion 16.

These window assemblies generally include a seal member affixed to that stationary window pane 13 adjacent the opening to be spanned by the sliding window pane 14. Prior known seal members generally have one or two lip portions which engage the sliding window in an attempt to prevent the incursion of water when the window is closed.

Figure 2:
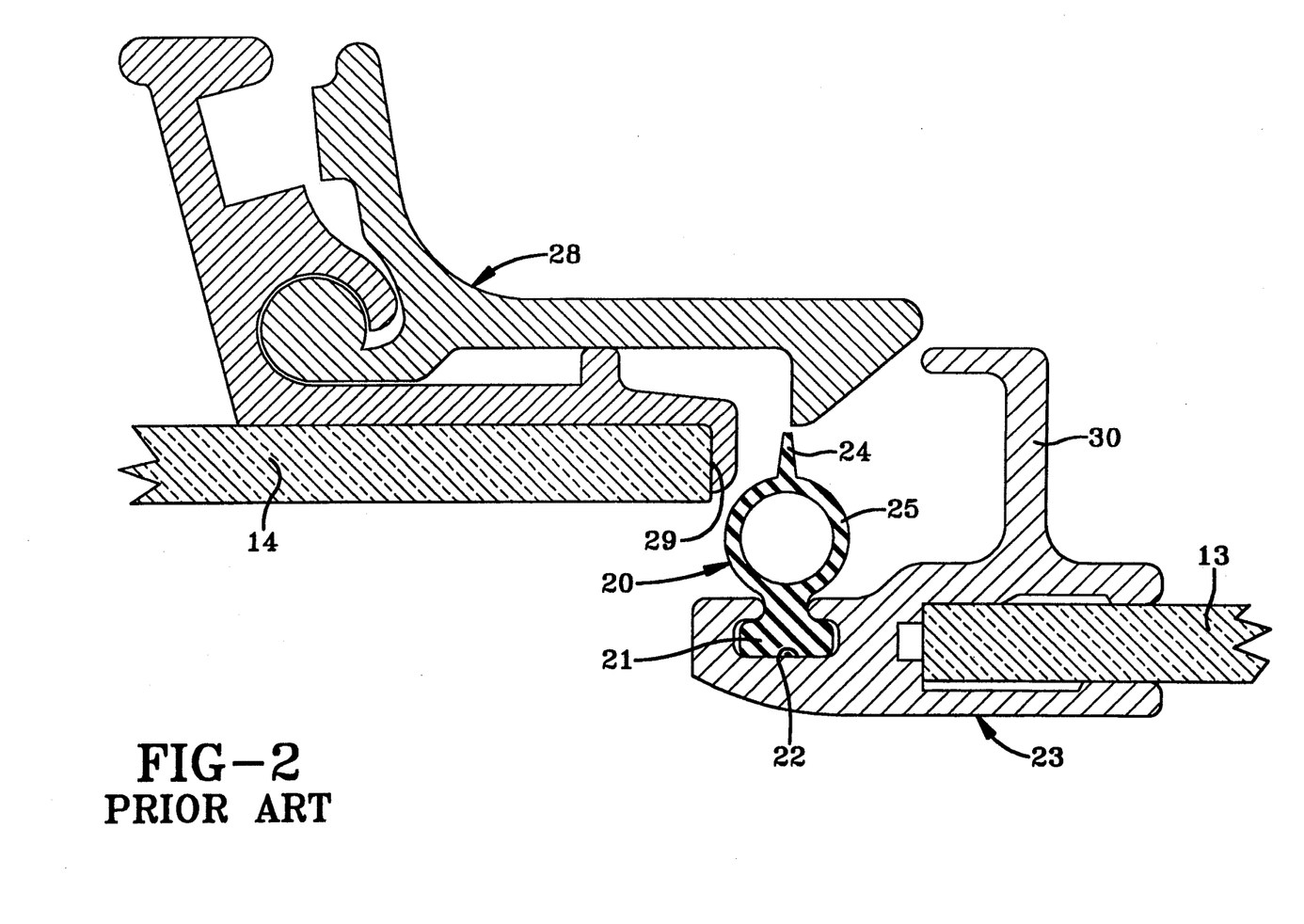
FIG. 2 is an enlarged cross section taken substantially along line X—X of FIG. 1 to depict a representative, prior art, single lip seal for a sliding window, the seal being disposed with the sliding window out of contact therewith.
Figure 3:
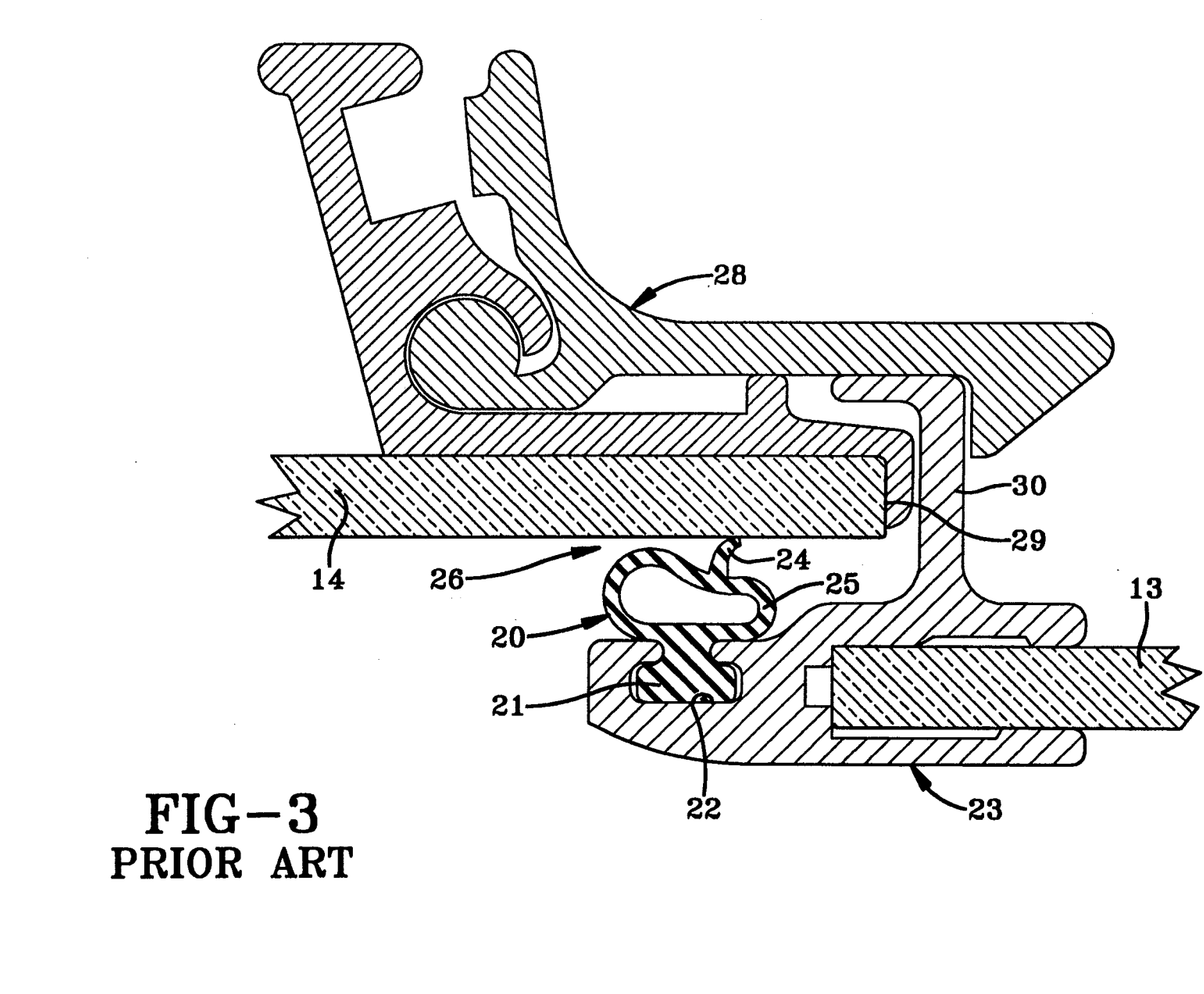
FIG. 3 is a view similar to FIG. 2, but depicting the prior art, single lip seal disposed in the configuration assumed when the sliding window has been closed.

That prior art solution depicted in FIGS. 2 and 3 represents a single lip seal 20 having a mounting base 21 that is received within a supporting recess 22 presented from the fixed, vertical strut 23. The seal 20 has a single lip portion 24 that extends perpendicularly to the plane of the sliding window pane 14 when the seal 20 is unstressed, as depicted in FIG. 2. An annular stress accommodator 25 is interposed between the base 21 and the lip portion 24. The flexibility of the lip portion 24 together with the resilience afforded by the annular stress accommodator 25 permits the lip portion 24 to lie along, or to be otherwise capable of bending in, the direction that the sliding window moves when being closed. The resulting disposition of the seal 20 when the sliding window pane 14 is closed is depicted in FIG. 3. As is well known, and as can be observed from FIG. 2, the single lip portion 24 which engages the sliding window pane 14 is susceptible of being lifted therefrom by external pressure along the window surface.

The external application of pressurized water against a seal having a single lip portion 24 is represented by arrow 26 in FIG. 3. With the pressurized water thus applied against the juncture of the single lip portion 24 against the sliding pane 14, the sealing affect can be readily breached to permit entry of the water between the lip portion 24 of the seal 20 and the sliding window pane 14 to enter the cab of the vehicle. This can occur in a car wash, and it can also occur when a power nozzle is used to clean the vehicle. It should be appreciated that the interaction of the locking catch assembly 28 mounted on the leading edge 29 of the sliding window pane 14 with the locking flange 30 that is also presented from the fixed, vertical strut 23 does not preclude the passage of any water that breaches the integrity of the seal 20.

When only a single lip 24 is utilized experience has shown that it is, therefore, virtually impossible to prevent the entrance of water into the cab. Attempts have been made to fabricate the single lip portion such that it applies a significant sealing force, but such an approach not only makes it more difficult to open and close the sliding window but also increases the cost of the seal.

Figure 4:
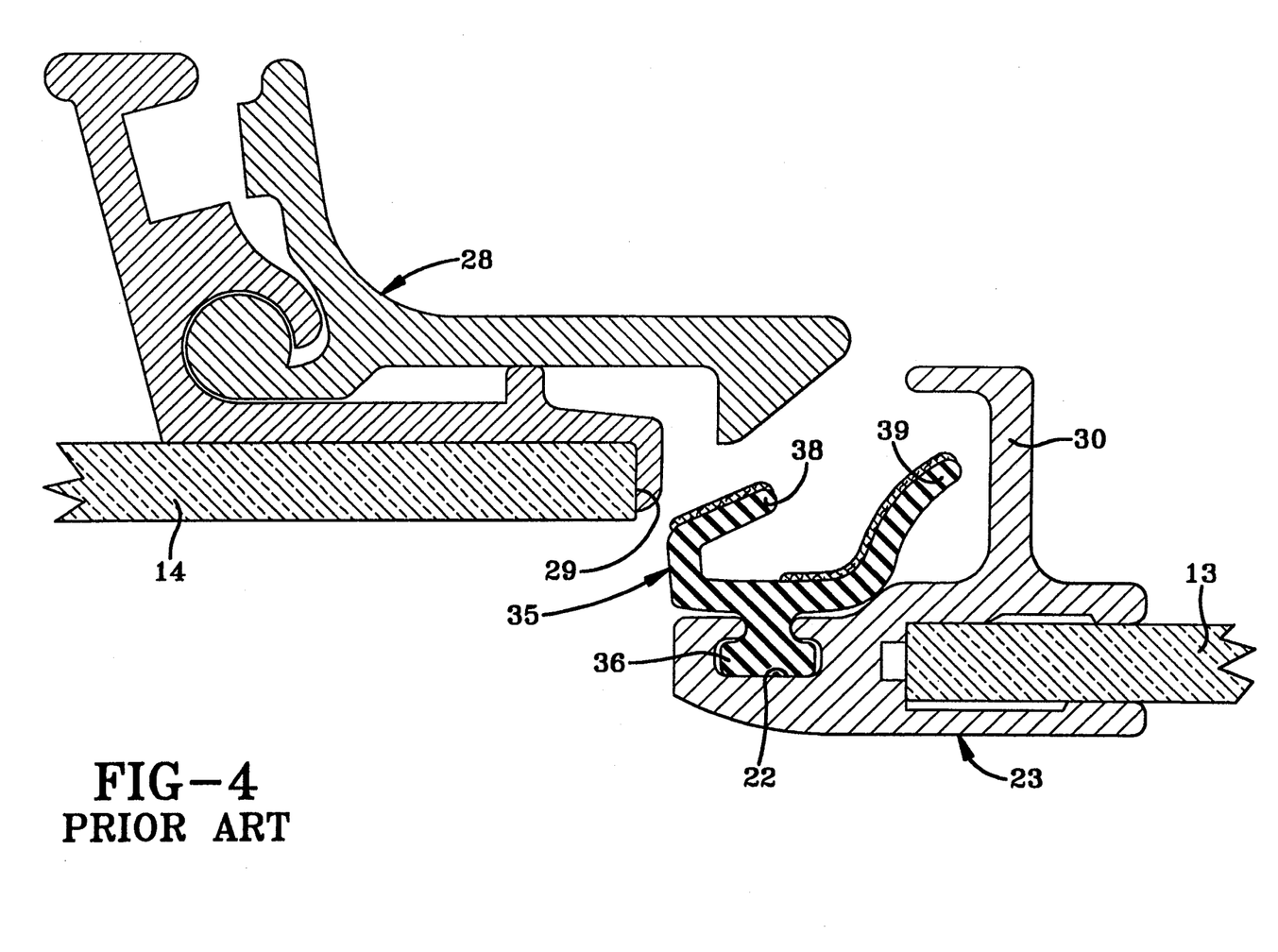
FIG. 4 is an enlarged cross section, similar to FIG. 2, and also taken substantially along line X—X of FIG. 1, to depict a representative, prior art, double lip seal for a sliding window, the seal being disposed with the sliding window out of contact therewith.
Figure 5:
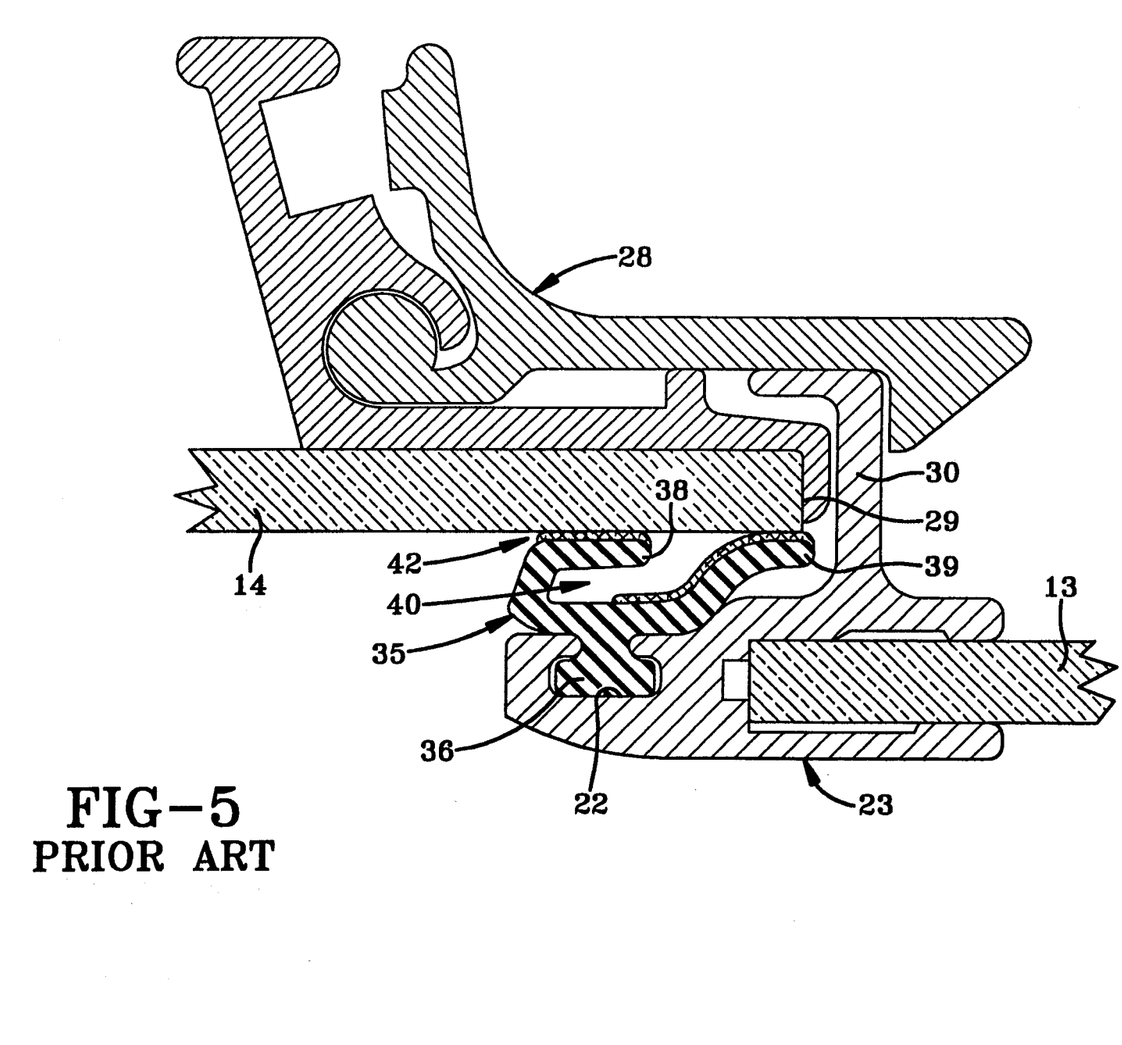
FIG. 5 is a view similar to FIG. 3, but depicting the prior art, double lip seal disposed in the configuration assumed when the sliding window has been closed.

A second solution to the problem, as seen in FIGS. 4 and 5, has been to provide a two lip seal 35, the mounting base 36 of which is also secured within the supporting recess 22 presented from the stationary, vertical strut 23. The seal 35 has two spaced lip portions 38 and 39 that extend outwardly from a transverse web 39 and toward the locking flange 30 presented from the strut 23. The two lip portions 38 and 39 are thus configured to lie against, and seal, against the sliding window pane 14. As seen in FIG. 4, both lip portions 38 and 39 are disposed to point in the direction that the sliding window pane 14 moves when it is being closed in order to prevent either of the lip portions 38 or 39 on the seal 35 from engaging the leading edge 29 of the sliding window pane 14 and thereby precluding, or interfering with, the ability of the sliding pane to close. This problem is often identified as "seal rollover."

The space 40 between the lip portions 38 and 39 is typically open to atmosphere, as by one or more apertures 41 that are disposed at the lowest point within the window frame assembly 10 (FIG. 1), and at a location that will not effect communication between the space 40 and the interior of the cab. This arrangement is well known to the prior art. Even so, this second arrangement does admit water into the cab when the water originates from a high pressure jet, as represented by the arrow 42 in FIG. 5. It is true that the second type of seal 35 is generally more effective than the single lip seal 20, but it is more expensive and requires a venting arrangement to clear the accumulation of any water that is admitted into the space 40 between the two tip portions 38 and 39. These requirements further add to the cost and complexity of the window assembly.

SUMMARY OF THE INVENTION

It is, therefore, a primary object of the present invention to provide an improved sliding window seal that effectively precludes the admission of water therepast, even when the water issues from a high pressure nozzle.

It is another object of the present invention to provide an improved seal structure for a sliding window, as above, wherein the sealing force increases when external pressures are applied.

It is a further object of the present invention to provide an improved sliding window seal, as above, wherein the seal has at least one sealing portion that moves out of the path of the sliding window when that window is opened.

It is yet a further object of the present invention to provide an improved seal structure for a sliding window, as above, wherein the seal incorporates a hinge to pivot at least one sealing wall out of contact with the sliding window as that window is opened.

It is still another object of the present invention to provide an improved seal structure for a sliding window, as above, wherein engagement of one sealing lip with the sliding window pivots the other sealing lip into sealing engagement with the sliding window pane during closing thereof.

These and other objects of the invention, as well as the advantages thereof over existing and prior art forms, which will be apparent in view of the following detailed specification, are accomplished by means hereinafter described and claimed.

In general, an improved seal structure for a sliding window embodying the concepts of the present invention has structure that overcomes the deficiencies of the prior art and will prevent the incursion of water into the cab. This advantage is provided by a seal structure having a mounting base that is secured in a supporting recess presented from the window frame assembly. A hinge is supported from the mounting base, and a pair of sealing lips are supported from the hinge. The hinge provided in this structure is preferably a living hinge having memory which causes it to seek and assume a predetermined position. The hinge permits the sealing lips to be positioned in a manner such that external pressure will provide increased seating pressure between the sealing lips and the sliding window pane. The hinge will also position the seal arms to permit the sliding window to open and close without imposing detrimental rollover forces on either sealing lip.

The sealing lips are disposed in diverging relation relative to the hinge. When the sliding window is closed, both sealing lips have a sealing surface that engages the window pane, with a first lip portion extending away from the closing direction and a second lip portion extending toward the closing direction. The second lip portion has an exposed surface presented to atmosphere and an engaging surface presented to the window and to a space between the sealing lip portions. When the pressure on the surface exposed to atmosphere is increased relative to the pressure in the space between the sealing lip portion, as would occur, for example, when a high pressure water stream is directed against the seal, the second sealing lip will be forced into increased sealing engagement with the window pane, thereby preventing the water from breaching the seal.

When the window is opened, the hinge pivots relative to the mounting base to remove the second sealing lip from the sliding path of the window while simultaneously moving the first sealing lip into the sliding path of the window. When the window is closed, the leading edge of the sliding window engages the first sealing lip to pivot the hinge, thereby forcing the second sealing lip into sealing engagement with the window pane. The withdrawal of the second sealing lip from the path of the window prevents that sealing lip from rolling over when the window is closing. The benefits of the improved seal embodying a living hinge with oppositely directed sealing lips will become apparent to those skilled in the art.

One exemplary embodiment of a sealing structure embodying the concepts of the present invention and adapted for use in a sliding window assembly, and deemed sufficient to effect a full disclosure of the subject invention, is shown by way of example in the accompanying drawings and is described in detail without attempting to show all of the various forms and modifications in which the invention might be embodied; the invention being measured by the appended claims and not by the details of the specification.

To acquaint persons skilled in the arts most closely related to The present invention, one preferred embodiment of an improved seal structure for a sliding vehicle window that illustrates a best mode now contemplated for putting the invention into practice is described herein by, and with reference to, the annexed drawings that form a part of the specification. The exemplary seal structure for a sliding window is described in detail without attempting to show all of the various forms and modifications in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

One representative form of an improved seal structure for a sliding window embodying the concepts of the present invention is designated generally by the numeral 50 on the accompanying drawings. The representative seal 50 is particularly adapted for use in conjunction with a frame assembly 10 for backlite. or sliding rear window, of a vehicle, such as a truck, having two fixed, or stationary, windows 12 and 13 which are secured in spaced relation within the frame assembly 10 in either a conventional manner or, preferably, in the manner shown in the aforesaid U.S. Pat. No. 5,228,740. The sliding window 14 overlaps, or spans, the space between the fixed windows 12 and 13 when the sliding window is in the closed position shown in FIG. 7. The frame assembly 10 has a seal receiving recess 51 presented from a fixed, vertical strut 52 adjacent to one side of the space between the fixed window panes 12 and 13. The receiving recess 51 is a preferably closed cavity having an open throat portion 53 facing the sliding window 14. A mounting base 54 is held within the receiving recess 51. To that end, the mounting base 54 may be bonded within the receiving recess 51, or it may be secured therein by the inherent forces in an elastomeric body that is compressed to fit into a space of slightly lesser volume. If desired, the mounting base 54 may have the same configuration as the mounting bases 21 depicted with respect to the prior art seals 20 and 35, which would permit a retrofit by removing the old seals 20 or 35 and replacing them with a seal 50 embodying the concepts of the present invention.

Figure 6:
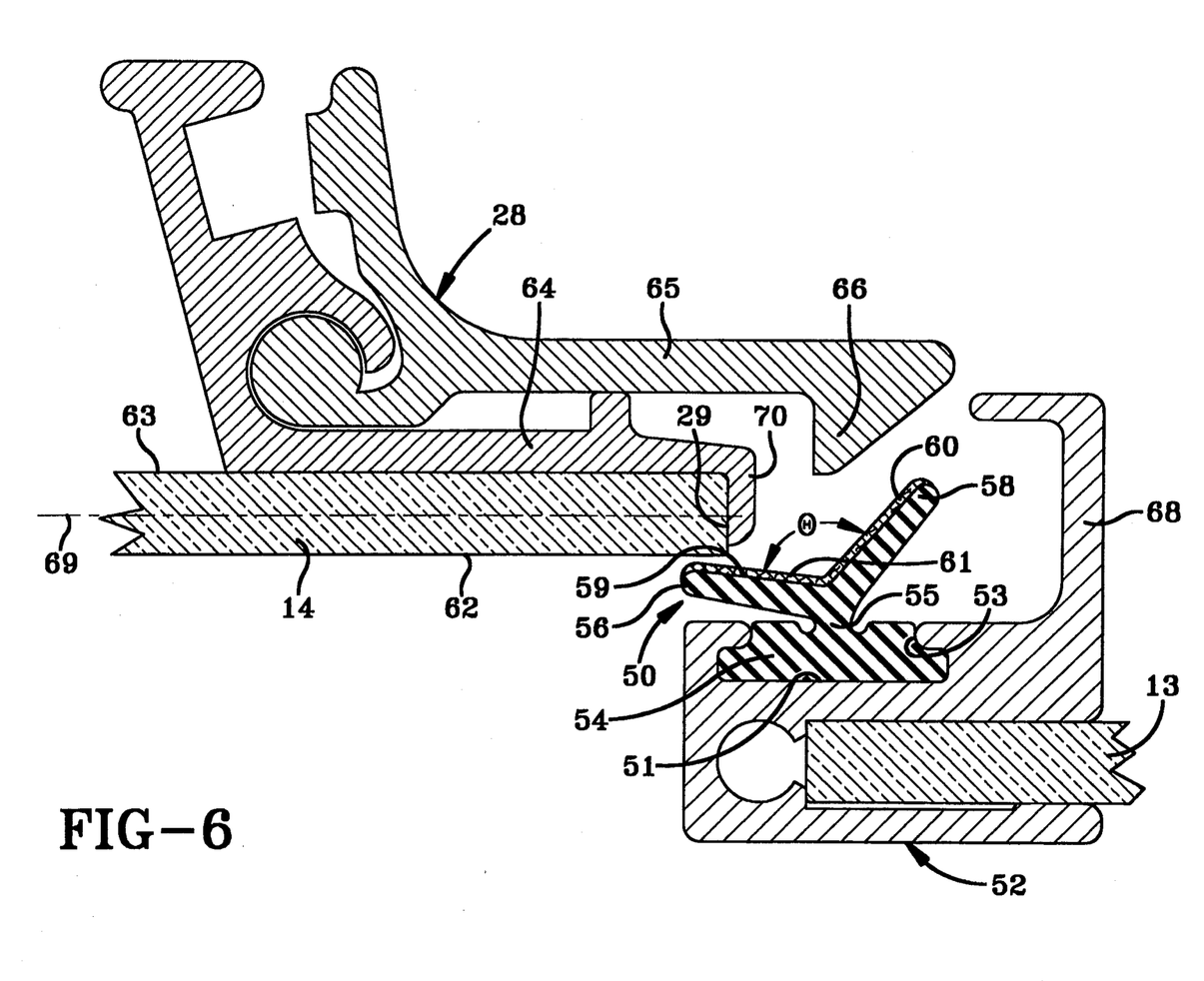
FIG. 6 is an enlarged cross section, similar to FIGS. 2 and 4, and also taken substantially along line X—X of FIG. 1, to depict a representative seal for a sliding window embodying the present invention, the lips of the improved sea being disposed with, the sliding window out of contact therewith; and, FIG. 7 is a view similar to FIGS. 3 and 5, but depicting the improved seal embodying the concepts of the present invention disposed in the configuration assumed when the sliding window has been closed.

The improved seal 50 has a hinge 55 presented from the mounting base 54 and extending outwardly through the throat 53 of the receiving recess and toward the plane of the sliding window 14. The hinge 55 is preferably of the type known as a "living hinge," and a pair of first and second lip portions 56 and 58 diverge from the hinge 55 in spaced relation to the mounting base 54 and at an included angle between the two unstressed lip portions 56 and 58 of about one hundred, twenty-five degrees (125°)—as represented by the angle $\Theta$—to present respective engaging surfaces 59 and 60 that will operatively engage the sliding window pane 14. As shown, the engaging surfaces may be provided with flocking 61 that is typically applied electrostatically and secured to the engaging surfaces 59 and 60 by a suitable adhesive, as is well known to the art. The flocking 61 on the engaging surfaces 59 and 60 assures that the sealing lips 56 and 58 will smoothly glide along the exterior surface 62 of the window pane 14 without undue resistance, as occurs when the rubber from which the seal 50 is made simply engages the exterior surface 62 of the glass from which the window pane 14 is made without any intervening material.

It should be understood that the sliding window pane 14 may not always be opened sufficiently for both the sealing lips 56 and 58 to disengage from the exterior surface 62 of the pane 14. Under such circumstances the full advantage of the improved seal 50 is not required. However, as will hereinafter be described, the major contribution of the present invention is that the improved seal 50 will fully and operatively accommodate a window pane 14 being opened beyond the seal 50.

As in the prior art arrangements, a latch assembly 28 may be bonded to the interior surface 63 of the window pane 14. The latch assembly 28 may have a body 64 which pivotally supports a latch arm 65. The latch arm 65 has a locking finger 66 adapted to cooperate with a locking flange 68 presented from the vertical strut 52 to secure the sliding window pane 14 in a closed position. As is well known to the art, the latch arm 65 can be pivoted on the body 64 to permit the locking finger 66 to clear the locking flange 68. This will permit the window pane 14 to be opened or closed by reciprocation within a track, not shown, along a displacement axis 69. As the sliding window pane 14 is moved along the displacement axis 69 to the open position, the hinge 55 will bias the sealing lips 56 and 58 to rotate counterclockwise as viewed in FIGS. 6 and 7. With this rotary motion, the first sealing lip 56 will pivot out of the path of the window 14 and thereby disengage the exterior surface 62 of window pane 14. Simultaneously, the second sealing lip 58 will pivot into the path of the window 14. Thus, the hinge 55 will continually urge the sealing lips 56 and 58 to that position depicted in FIG. 6.

Figure 7:
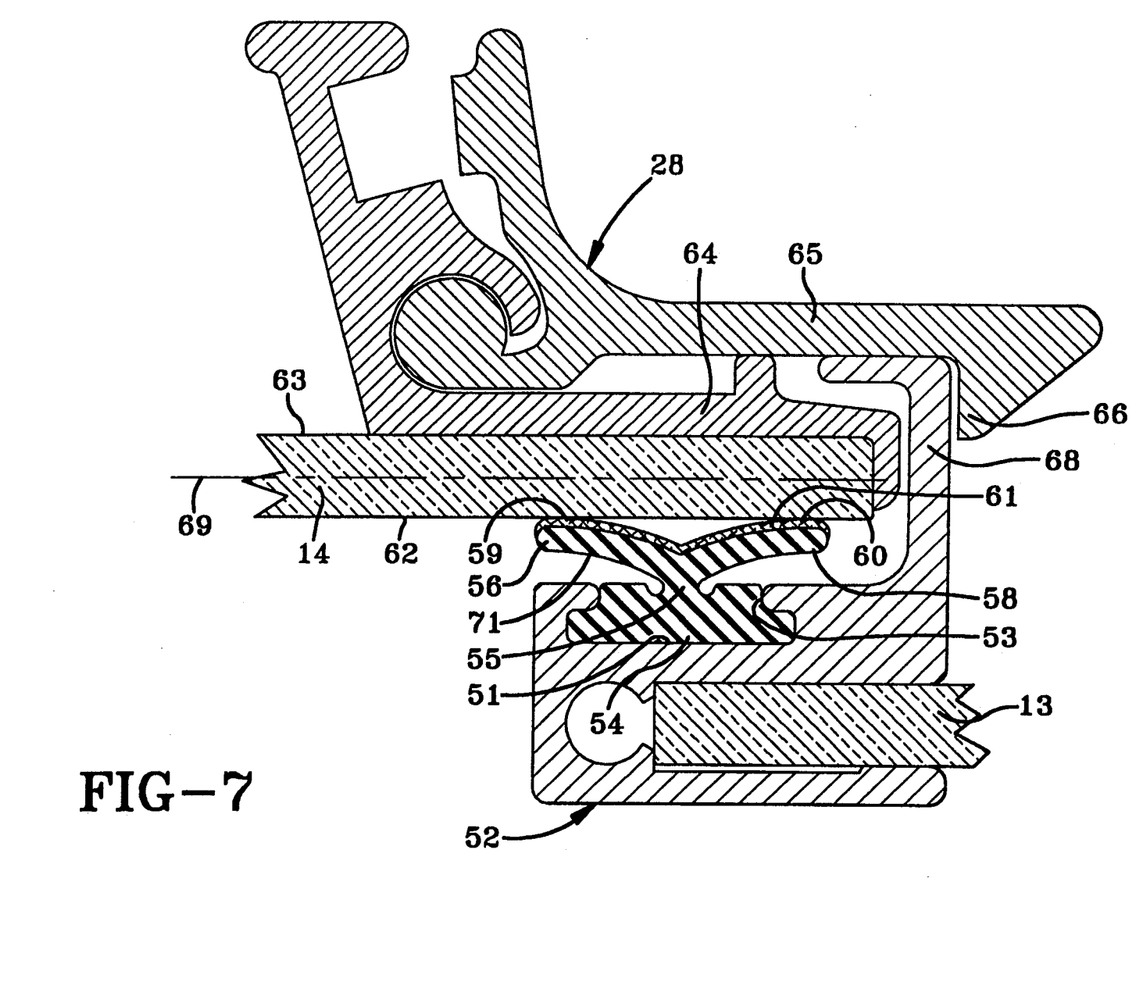

When closure of the window 14 is effected by translation thereof along the displacement axis 69, the leading edge 70 on the body 64 of the latch assembly 28—or even the leading edge 29 of the window 14—will engage the second sealing lip 58 to rotate the conjoined first and second lip portions 56 and 58 clockwise about the hinge 55. Thus, engagement of the window pane 14 (or something attached thereto) will rotate, or pivot, the second sealing lip 58 out of the path of the window pane 14 while simultaneously rotating the first sealing lip 56 into sealing engagement with the exterior surface 62 of the window pane 14. This rotation will continue until the exterior surface 62 of the window pane 14 is sealingly engaged by the first and second sealing lips 56 and 58, as shown in FIG. 7. The seal 50 will operate in the manner described irrespective of whether the sliding window pane 14 only partially, or fully, disengages from the seal 50.

As best seen in FIG. 7, the sealing lip 56 presents an outwardly directed surface 71. When a jet of pressurized water is directed against the seal 50, the outwardly facing surface 71 on the first sealing lip 56 will be urged, by the pressure of the water, into even firmer sealing engagement with the exterior surface 62 of the window pane 14, thereby preventing any water from flowing past the seal 50. Hoses used in car washes will typically be directed against the vehicle with as much as six hundred pounds per square inch (600 Lb/in$^2$). However, a seal 50 embodying the concepts of the present invention has successfully precluded the admission of water applied directly to either the window or the seal (or the juncture thereof) with as much as nine hundred pounds per square inch (900 Lb/in$^2$).

The foregoing description of the exemplary embodiment of the invention has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

As should now be apparent, the present invention not only teaches that a seal embodying the concepts of the present invention is capable of effectively precluding the admission of water therepast—even when directed along the surface of the window with a high pressure hose—but also that the other objects of the invention can be likewise accomplished.

I claim:

1. A window seal and frame assembly in combination, said combination comprising:
    a window frame assembly having an opening defined between spaced edges;
    a window pane supported from said frame assembly and being reciprocatingly displaceable between an open and a closed position;
    a seal supported from said window frame assembly adjacent one edge of said opening in said window frame assembly;
    said seal having a mounting base secured to said frame assembly;
    hinge means supported from said mounting base;
    first and second diverging sealing lips supported from said hinge means for engaging said reciprocatingly displaceable window pane when said window pane is closed and for disengaging from said window pane when said window pane is opened;
    said hinge means urging said first sealing lip to disengage from said window pane in order to clear a path for reciprocating displacement of said window pane during opening and closing thereof.

2. A window seal and frame assembly combination, as set forth in claim 1, wherein:
    said hinge means urges said second sealing lip into the path of motion of said window pane during opening of the sliding window pane.

3. A window seal and frame assembly combination, as set forth in claim 2, wherein:
    engagement of said window pane with said second sealing lip overcomes the biasing action of said hinge means to drive said first sealing lip into engagement with said reciprocatingly displaceable window pane.

4. A window seal and frame assembly combination, as set forth in claim 3, wherein said hinge means comprises:
    a living hinge.

5. A window seal and frame assembly combination, as set forth in claim 4, wherein:
    said first and second sealing lips diverge at approximately one hundred, twenty-five degrees (125°).

6. A window seal and window frame assembly in combination, said combination comprising:
    first and second stationary window panes mounted in the frame assembly;
    said stationary window panes being disposed in spaced opposition to present opposed edges;
    an opening between said spaced edges of said stationary window panes;
    a seal receiving means located in proximity to the edge of one said stationary window pane;
    a displacement axis spanning said opening;
    a sliding window reciprocatingly displaceable within said opening and along said displacement axis;
    a seal;
    said seal having a mounting base supported in said seal receiving means to interact with said sliding window as said sliding window is opened and closed;
    a hinge means supported from said mounting base;
    first and second, oppositely diverging, sealing lips supported from said hinge means;
    said first and second sealing lips engaging said sliding window when the sliding window is spanning the opening and at least said first sealing lip disengaging from said sliding window when said sliding window is not spanning the opening.

7. A window seal and frame assembly combination, as set forth in claim 6, wherein:
    said hinge urges said first sealing lip to disengage from said sliding window and simultaneously urges said second sealing lip toward a position which locates said second sealing lip along the displacement axis of said sliding window.

8. A window seal and frame assembly combination, as set forth in claim. 7, wherein:
    engagement of said window pane with said second sealing lip overcomes the biasing action of said hinge means to drive said first sealing lip into engagement with said reciprocatingly displaceable window pane.

9. A window seal and frame assembly combination, as set forth in claim 9, wherein:
    said first and second sealing lips diverge at approximately one hundred, twenty-five degrees (125°).

10. A window seal and frame assembly combination, as set forth in claim 6, wherein:
    said hinge has inherent memory that urges said conjoined sealing lips to a position with said first sealing lip being removed from said displacement axis to disengage from said sliding window and with said second sealing lip interposed along said displacement axis to be engaged by said sliding window when said sliding window is closed.

* * * * *